Patented Feb. 17, 1942

2,273,041

UNITED STATES PATENT OFFICE 2,273,041

TREATMENT OF HYDROCARBONS

Vladimir N. Ipatieff and Herman Pines, Chicago, Ill., assignors to Universal Oil Products Company, Chicago, Ill., a corporation of Delaware No Drawing. Application July 3, 1939,
Serial No. 282,664

6 Claims. (Cl. 196—10)

This application is a continuation-in-part of application 145,567 filed 5-29-37, which is a continuation-in-part of application 140,163 (now Patent No. 2,112,846) filed 5-1-37, which is a continuation-in-part of application 35,235 filed August 8, 1935.

This invention relates to the treatment of paraffin hydrocarbons which are gaseous at ordinary temperatures and pressures, particularly isobutane.

In a more specific sense, the invention is concerned with a novel process for alkylating isobutane with olefins which are normally gaseous to produce saturated hydrocarbons of higher molecular weight which can be utilized as constituents of motor fuel for automobile and aeroplane engines.

The cracking process which is operated principally with the object of producing gasoline from heavier and less valuable petroleum fractions incidentally produces considerable yields of fixed gases comprising hydrogen, methane, ethane, propane and butanes as well as ethylene, propylene and butylenes, in varying quantities and proportions. In most instances these gases are considered to have merely a fuel value though attempts are made from time to time to utilize the olefinic constituents for the manufacture of hydrocarbon derivatives on a commercial basis. In one application of the present process the isobutane present in cracked gas mixtures is utilized as a source of additional yields of motor fuel fractions to augment those primarily produced by the cracking operation. While the process is particularly applicable to cracked gas mixtures and particularly selected fractions produced therefrom in the stabilizers of cracking plants, it is also applicable to the treatment of isobutane produced from any other source.

In one specific embodiment the present invention comprises a process for the alkylation of a molal excess of isobutane with isobutene to form octanes and other products utilizing temperatures from 0 to approximately 150° C., superatmospheric pressures sufficient to maintain a substantial proportion of reactants in liquid phase and catalysts comprising aluminum chloride and hydrogen chloride.

As a basis for the present invention, it has been determined that in the alkylation of isobutane with isobutene to form octanes and other products of gasoline boiling range, temperatures above 0° C. may be employed without danger of polymerization reactions taking place instead of alkylation if sufficient pressure, such as 5 to 50 atmospheres, is imposed upon the reaction zone to maintain a substantial amount of liquid phase at all times and if a considerable excess of the isobutane is present. As will be indicated in experimental data in a later section, the temperature of the reaction can be safely raised to 100° C. without any loss in gasoline boiling range material although there is some diminution in the yields of octanes corresponding to products of primary alkylation reactions when higher temperatures are employed. The use of elevated temperatures along with superatmospheric pressures is accompanied by an increase in the rate of the reactions and an increase in the capacity of commercial equipment so that when the main object of the alkylation reactions is the production of high antiknock gasoline boiling range material, the present type of operation is preferable over the use of temperatures below 0° C. without imposed pressure, though the lower temperature type of operation may produce somewhat higher yields of octanes which are the products of the primary alkylation reactions.

The total reactions occurring when isobutane is alkylated with isobutene within the approximate range of conditions specified will necessarily involve to some extent not only simple alkylation corresponding to the addition of one or more molecules of the olefin to the isoparaffin but also some reactions of polymerization and some reactions of decomposition, so that the net result is the production of a mixture of hydrocarbons having a considerable boiling range but containing a large proportion of mono- along with some di-alkylated products. The reactions of polymerization are usually of a negligible order when a moderate excess of isoparaffin is present in the reaction zone.

The actual operation of the process admits of some modification depending upon whether batch or continuous operations are employed. In batch operation wherein substantially only isobutane and isobutene are concerned, the paraffin is maintained in liquid phase by the application of sufficient pressure at the temperature chosen for the treatment, finely divided anhydrous aluminum chloride is maintained in suspension by mechanical agitation or rotation of the pressure vessel and alkylation is effected by the gradual introduction of isobutene and a small amount of hydrogen chloride under the surface of the liquid. The hydrogen chloride is preferably used in the amount of about 1 to 10% by weight of the aluminum chloride. After a treatment is completed the aluminum chloride layer is allowed to settle, the reaction vessel is cooled and the pressure released, and the upper hydrocarbon layer is removed by decantation and subjected to fractionation for the removal of uncombined hydrocarbons as a light overhead and the recovery of the desired motor fuel fraction.

Continuous operations may be conducted by passing a proportioned mixture of a major proportion of isobutane and a minor proportion of isobutene containing suspended therein a small amount of anhydrous aluminum chloride through a tubular heating element at the entrance to which a small amount of hydrogen chloride is injected. The products from the heater are then discharged into a separator from which the spent catalyst is withdrawn as a lower layer and the upper hydrocarbon layer is pumped to a fractionator to remove uncombined low boiling hydrocarbons as an overhead fraction and produce gasoline boiling range material as an intermediate cut. In cases where there is any considerable production of material boiling higher than the end point of commercial gasoline, fractionation of the hydrocarbon layer may be done in two stages, the first stage removing the uncombined four-carbon atom hydrocarbons and hydrogen chloride which is recovered and recycled for further use and being in effect a stabilization and the second stage distilling the gasoline boiling range material as an overhead. Details of such continuous procedures are more or less familiar to those conversant with oil refinery operations and other procedures than those mentioned may suggest themselves which can be made without departing from the general scope of the invention.

The present process can be successfully utilized to produce octanes which are largely of an isomeric character from the mixture of four carbon atom hydrocarbons obtainable either by the close fractionation of cracked gas mixtures such as those produced as overhead from cracking plant stabilizers or by utilizing a secondary cut of the overhead from the stabilizers which consists principally of the desired four carbon atom hydrocarbons including isobutylene, normal butylenes, isobutane and normal butane. In the treatment of such mixtures with alkylating catalyst mixtures such as aluminum chloride and hydrogen chloride, conditions can be regulated so that the primary reactions involve principally the interaction of the iso compounds and the primary liquid products are those formed by the alkylation of isobutane with isobutylene. To obtain the best results in any instance it is preferable to proportion the olefins by any necessary additions so that there is at all times a considerable excess of paraffinic hydrocarbons present to foster alkylation and prevent polymerization.

The reactions of the present invention can if desired be brought about between isobutane and isobutene separated by fractionation and solvent extraction methods from B–B fractions. For example, the olefins may be concentrated by their preferential solubility in various types of hydrocarbon solvents and the olefin concentrate fractionated to recover the desired isobutene. Similarly the iso and n-butanes can be separated by the fractionation of the raffinate and the isobutane and isobutene proportioned give the best results in respect to yield of gasoline boiling range material and antiknock value, which is unusually high on account of the branched chain character of the majority of the products of the reactions.

In the presence of an excess of isobutane, one molecule of isobutene tends to react with its molecular equivalent of isobutane while the excess of isobutane remains unaffected. When more isobutene is used than corresponds to about one mole to three moles of isobutane there is an increased tendency for polymerization reactions to occur in preference to alkylation reactions. This is to be expected to some extent on account of the readiness with which isobutene alone is polymerized by aluminum chloride. However, by maintaining the proper excess of the paraffin hydrocarbon, which will vary with the particular temperature employed in the range previously specified, being higher at the higher temperatures, the course of the reactions may be kept principally in the direction of production of alkylated products of a saturated rather than an olefinic character. In order to balance up any disproportion on the side of either the isobutene or the isobutane as they may occur in butane-butene fractions, either hydrocarbon may be added from outside sources to produce a mixture containing isobutane and isobutene in the optimum molecular proportions for producing products of the desired degree of alkylation. It will be shown in subsequent examples that there is some production of dodecanes as well as octanes, the former compounds corresponding to alkylation of isobutene by two isobutyl groups.

The process may be utilized for the direct improvement of low antiknock value gasolines by suspending aluminum chloride therein at the required low temperatures and passing either a proportioned mixture of isobutane and isobutylene into the suspension along with a trace of hydrogen chloride or still more simply by passing a cracked gas mixture or a stabilizer reflux into the same gasoline. The gasoline functions both as a solvent and a reaction medium and the alkylation products are formed and blended with the gasoline at the same time to increase its antiknock value to an extent depending upon the amount of alkylated products added. Paraffinic gasolines particularly at the higher temperatures of operation will undergo some decompositions and rearrangements from the action of the aluminum chloride so that the net results will be a marked increase in the antiknock value of the original gasoline.

The following tabulation of experimental data is given as illustrative of the type of results normally obtainable by the use of the present process, although it is not given with the intention of limiting the scope of the invention in exact conformity with the data presented.

The tabulation shows the results of the experiments in the alkylation of isobutane with isobutene in 4 runs at temperatures from $+16$ to $+150°$ C. under pressures sufficient to maintain a large proportion of liquid phase present in the reaction zone. The isobutane and aluminum chloride were charged to a pressure vessel maintained at the desired reaction temperature by an oil bath and the isobutene and hydrogen chloride were gradually introduced during the time shown as the duration of the run. At the completion of the reactions the pressure vessel was cooled and the products recovered and fractionated.

| | Run | | | |
|---|---|---|---|---|
| | 1 | 2 | 3 | 4 |
| Charge: | | | | |
| i-C₄H₁₀ ... parts by weight.. | 336 | 336 | 338 | 202 |
| AlCl₃ ... do.... | 25 | 25 | 30 | 30 |
| HCl ... do.... | 7.5 | 5.5 | 5 | 8 |
| i-C₄H₈ ... do.... | 112 | 112 | 110 | 82 |
| Duration of run ... hours... | 2.5 | 2.0 | 1.75 | 1.0 |
| Temperature ... °C.. | 16 | 47 | 100 | 150 |
| Pressure ... atmospheres.. | 5–6 | 7–8 | 17–20 | 37–45 |
| Product: | | | | |
| Upper hydrocarbon layer | 143 | 145 | 165 | 64.3 |
| Lower spent catalyst layer | 41.5 | 44.5 | 56.5 | 40 |
| Distillation: | | | | |
| 25–45 | 11.6 | 17.3 | 27.7 | ¹ 57.5 |
| 45–75 | 10.6 | 12.1 | 18.6 | 8.3 |
| 100–125 (octanes) | 41.6 | 31.5 | 23.2 | 8.3 |
| 125–150 | 9.0 | 9.4 | 9.1 | 6.0 |
| 150–175 | 4.5 | 4.7 | 4.0 | 3.0 |
| 175–200 | 7.0 | 4.7 | 4.0 | 2.3 |
| to 225 Total | 95.2 | 93.9 | 98.0 | ² 94.7 |

¹ Distillation included the pentanes in the gases and the first fraction was taken from 25–55° C.
² 215° C. end point.

It is observable that there is a uniform production of gasoline boiling range hydrocarbon layer at temperatures up to 100° C. but a marked falling off of the production of this material at 150° C. The distillation of the gasoline product shows a marked decrease in octane fraction boiling from 100–125° C. and a sharp increase in the fractions boiling below 55° C. It is therefore most logical to operate the process at temperatures of 100° C. or lower, unless the lower boiling paraffin hydrocarbons such as pentanes and hexanes are desired in larger quantities.

The nature and practical aspects of the present invention are obvious from the preceding specification and numerical data although neither section is intended to unduly limit its scope.

We claim as our invention:

1. A process for the alkylation of isobutane with isobutene which comprises subjecting a hydrocarbon mixture containing isobutene and a quantity of isobutane in excess of that of the isobutene to the action of aluminum chloride and hydrogen chloride at an alkylating temperature above 0° C. and under sufficient superatmospheric pressure to maintain a substantial portion of the reactants in liquid phase.

2. The process as defined in claim 1 further characterized in that the molal excess of isobutane to isobutene in said hydrocarbon mixture is approximately 3 to 1.

3. The process as defined in claim 1 further characterized in that said pressure is in the approximate range of 5 to 50 atmospheres.

4. The process as defined in claim 1 further characterized in that the molal excess of isobutane to isobutene in said hydrocarbon mixture is approximately 3 to 1 and said pressure is in the approximate range of 5 to 50 atmospheres.

5. The process as defined in claim 1 further characterized in that the hydrogen chloride is present in the amount of about 1 to 10% by weight of the aluminum chloride.

6. An alkylation process which comprises reacting isobutene with isobutane in the presence of aluminum chloride and hydrogen chloride at an alkylating temperature above 0° C. and under sufficient pressure to maintain a substantial portion of the hydrocarbons in liquid phase.

VLADIMIR N. IPATIEFF.
HERMAN PINES.